United States Patent
Ishigami et al.

(10) Patent No.: US 8,548,723 B2
(45) Date of Patent: Oct. 1, 2013

(54) CAR NAVIGATION SYSTEM

(75) Inventors: Tadatomi Ishigami, Tokyo (JP); Masatoshi Fujii, Tokyo (JP); Shigeki Kumagai, Hyogo (JP); Keika Kan, Tokyo (JP); Sadami Ouchi, Tokyo (JP); Hiroaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 788 days.

(21) Appl. No.: 12/517,944

(22) PCT Filed: Nov. 1, 2007

(86) PCT No.: PCT/JP2007/071327
§ 371 (c)(1),
(2), (4) Date: Jun. 5, 2009

(87) PCT Pub. No.: WO2008/087778
PCT Pub. Date: Jul. 24, 2008

(65) Prior Publication Data
US 2010/0292915 A1    Nov. 18, 2010

(30) Foreign Application Priority Data

Jan. 18, 2007  (JP) .................................. 2007-009398

(51) Int. Cl.
*G01C 21/00*    (2006.01)

(52) U.S. Cl.
USPC ........................................................ 701/200

(58) Field of Classification Search
USPC ........................................................ 701/200
See application file for complete search history.

(56) References Cited

U.S. PATENT DOCUMENTS

2006/0065050 A1*  3/2006  Saito et al. ................... 73/511
2006/0247854 A1*  11/2006  Esaki et al. ................. 701/210

(Continued)

FOREIGN PATENT DOCUMENTS

JP    5-18765 A    1/1993
JP    6-324066 A    11/1994

(Continued)

OTHER PUBLICATIONS

Asaoka, "Motion Alignment in INS/GPS Hybrid Navigation", Graduation Thesis, Year 2001, pp. 12-17, System Control Engineering (Dr. Sugimoto's) Laboratory of Department of Electrical and Electronic Engineering, College of Science and Engineering, Ritsumeikan University.

*Primary Examiner* — Valerie Lubin
*Assistant Examiner* — Reginald R Reyes
(74) *Attorney, Agent, or Firm* — Birch, Stewart, Kolasch & Birch, LLP

(57) ABSTRACT

A car navigation system includes a distance sensor 2; an angular velocity sensor 1 for detecting angular velocity having a sensor detection axis in a vertical direction of a casing; an acceleration sensor 3 for detecting acceleration having a sensor detection axis in a back and forth direction of the casing on a horizontal plane; a body velocity and acceleration measuring unit 42 for measuring velocity and acceleration in the body direction of vehicle movement from the signal from the distance sensor; an angular velocity measuring unit 41 for measuring angular velocity from the signal from the angular velocity sensor; a body roll angle estimating unit 43 for estimating a body roll angle from the body direction of vehicle movement velocity and angular velocity; an acceleration sensor output estimating unit 45 for outputting, when the casing is set in the body with a rotation in a yaw direction, estimation values of the output signal of the acceleration sensor at every prescribed angle; and a yaw direction mounted angle detecting unit 46 for determining as a yaw direction mounted angle in the body an angle at a time when an estimated value is obtained which agrees most closely with a value remaining after subtracting from the signal from the acceleration sensor its offset component.

9 Claims, 8 Drawing Sheets

Angular Velocity About Sensor Detection Axis (clockwise Direction Is Positive Direction) [rad/s]
$X_B$ Axis: Roll Rate ($\omega_{B\text{-roll}}$)
$Y_B$ Axis: Pitch Rate ($\omega_{B\text{-pitch}}$)
$Z_B$ Axis: Yaw Rate ($\omega_{B\text{-yaw}}$)

(56) References Cited

U.S. PATENT DOCUMENTS

| | | | |
|---|---|---|---|
| 2007/0135989 A1* | 6/2007 | Hengst | 701/117 |
| 2007/0156316 A1* | 7/2007 | Ono | 701/38 |
| 2008/0040004 A1* | 2/2008 | Breed | 701/45 |

FOREIGN PATENT DOCUMENTS

| | | |
|---|---|---|
| JP | 9-42979 A | 2/1997 |
| JP | 10-332415 A | 12/1998 |
| JP | 2001-153658 A | 6/2001 |
| JP | 2002-243494 A | 8/2002 |
| JP | 2004-125689 A | 4/2004 |
| JP | 3576789 B2 | 7/2004 |
| JP | 2005-140627 A | 6/2005 |
| JP | 2006-329972 A | 12/2006 |

* cited by examiner

FIG. 1

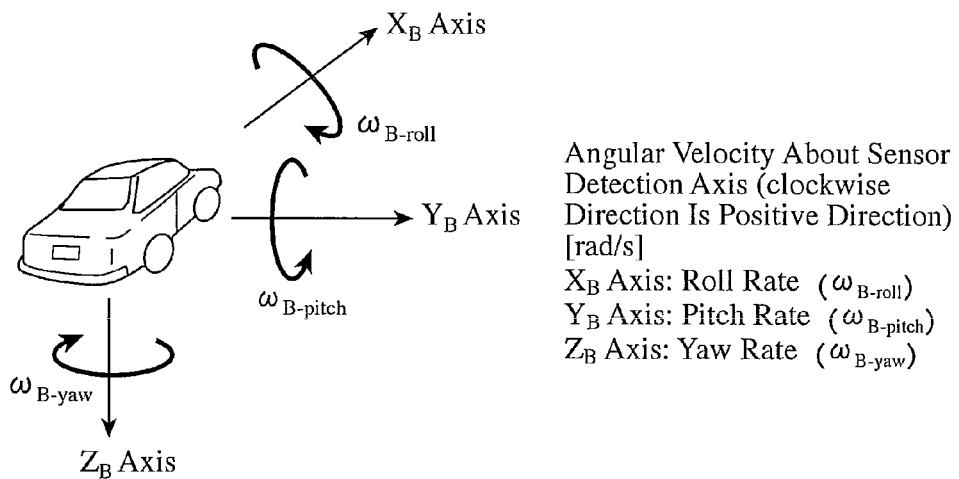

Angular Velocity About Sensor Detection Axis (clockwise Direction Is Positive Direction) [rad/s]
$X_B$ Axis: Roll Rate ($\omega_{B\text{-roll}}$)
$Y_B$ Axis: Pitch Rate ($\omega_{B\text{-pitch}}$)
$Z_B$ Axis: Yaw Rate ($\omega_{B\text{-yaw}}$)

FIG. 2

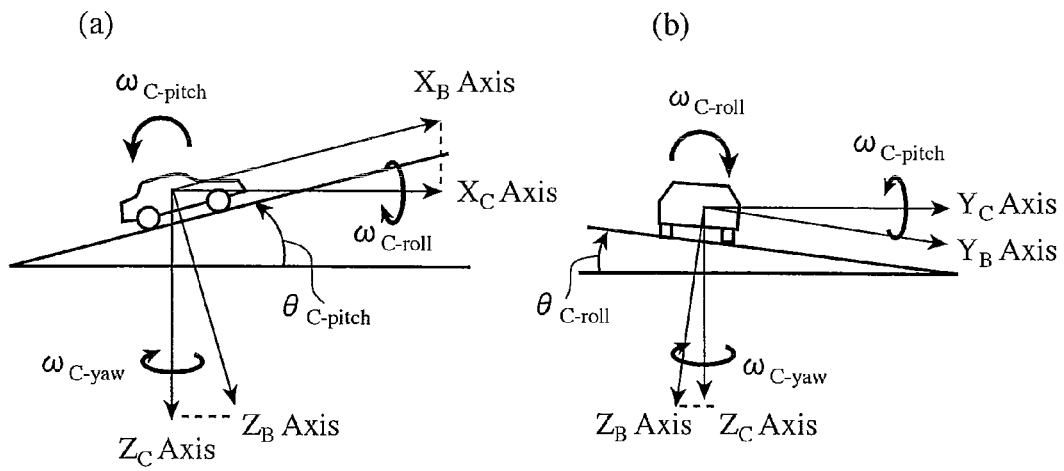

(a) Angular Velocity About Orthogonal 3 Axes Having Horizontal Plane As X-Y Plane [rad/s]
$X_C$ Axis: Roll Rate ($\omega_{C\text{-roll}}$)
$Y_C$ Axis: Pitch Rate ($\omega_{C\text{-pitch}}$)
$Z_C$ Axis: Yaw Rate ($\omega_{C\text{-yaw}}$)

(b) Attitude Angle With Respect to Horizontal Plane [rad]
$X_C$ Axis: Body Roll Angle ($\theta_{C\text{-roll}}$)
$Y_C$ Axis: Body Pitch Angle ($\theta_{C\text{-pitch}}$)
$Z_C$ Axis: Body Heading Angle ($\theta_{C\text{-yaw}}$)

CAR NAVIGATION SYSTEM

TECHNICAL FIELD

The present invention relates to a car navigation system for measuring, when a vehicle is moving along a road including slopes, its quantity of motion associated with its body attitude such as an inclination angle, angular velocity, velocity or acceleration, and particularly to a technique for measuring the body attitude accurately by correcting effect of the remaining axes on the output of the sensor even when the casing of the car navigation system is set in the car body in such a manner that the sensor detection axes are askew.

BACKGROUND ART

Conventionally, in a car navigation system, to improve the detection accuracy of the current position and heading angle of the vehicle, a contrivance is made for obtaining on a horizontal plane the variance of the heading angle of vehicle movement and distance of vehicle movement (velocity) more accurately.

For example, as for a vehicle position detecting device disclosed in Patent Document 1, to eliminate a problem in that a yaw rate detected by an angular velocity sensor has an error when there is a lateral inclination of the body or a lateral road slope during a turn of a vehicle, the vehicle position detecting device estimates a yaw rate error using a roll angle, and carries out, by correcting the heading angle error involved in the yaw rate error, map matching considering a position calculation or heading angle error of the vehicle. In this case, the roll angle is calculated according to a prescribed equation using the angular velocity sensor and a distance sensor.

In addition, as for a rotation plane maintaining angular velocity sensor disclosed in Patent Document 2, to eliminate a problem in that a yaw rate an angular velocity sensor detects reduces when there is a body inclination (pitch angle) or road slope in the direction of vehicle movement of the body while the vehicle is moving on a slope, the rotation plane maintaining angular velocity sensor corrects the yaw rate using a road slope angle. In this case, the road slope angle is calculated using the angular velocity sensor and a distance sensor.

Besides, as for an onboard navigation system disclosed in Patent Document 3, to eliminate a problem of causing an error because the distance of vehicle movement (velocity) calculated from the pulse signal during traveling a slope, which the distance sensor outputs in accordance with the number of revolutions of the wheels of the vehicle, becomes longer than the distance (velocity) projected onto a horizontal plane, the onboard navigation system corrects the distance of vehicle movement (velocity) on the horizontal plane using the road slope angle. Furthermore, in the same manner as the technique disclosed in Patent Document 2, it corrects the yaw rate using the road slope angle. In this case, the road slope angle is calculated from the axial accelerations detected by a 3-axis acceleration sensor and the acceleration of the vehicle measured by a distance sensor.

In addition, as for an angular velocity correcting device disclosed in Patent Document 4, to eliminate a problem in that when the vehicle is moving a slope during a turn, the lateral acceleration component of the body is superimposed onto the acceleration in the direction of vehicle movement of the body detected by an acceleration sensor, the angular velocity correcting device calculates the pitch angle by subtracting the lateral acceleration component of the body from the acceleration detected by the acceleration sensor and corrects the yaw rate on the basis of the pitch angle. In this case, the lateral acceleration component of the body is calculated using the velocity and the yaw rate.

Furthermore, as for a road geometry measuring device disclosed in Patent Document 5, to eliminate the problem in that the lateral acceleration component of the body is superimposed onto the acceleration in the direction of vehicle movement of the body detected by an acceleration sensor in the same manner as the technique disclosed in Patent Document 4, the road geometry measuring device calculates the road slope angle and road bank angle (angle of the lateral inclination of the road) by removing the lateral acceleration component of the body from the acceleration detected by the acceleration sensor. In addition, it detects the angle (pitch angle or roll angle) of the body in the traveling or lateral direction of the body because of the effect of the acceleration or deceleration in the direction of vehicle movement of the body or the lateral acceleration of the body with a vehicle height sensor, and extracts the true road slope angle and body bank angle. In this case, centrifugal force is calculated using the velocity measured by the distance sensor, the yaw rate detected by the angular velocity sensor, and the distance between the rotation axis of the body and the fixed position of the acceleration sensor.

Patent Document 1: Japanese Patent Laid-Open No. 05-018765/1993.
Patent Document 2: Japanese Patent Laid-Open No. 06-324066/1994.
Patent Document 3: Japanese Patent Laid-Open No. 09-42979/1997.
Patent Document 4: Japanese Patent Laid-Open No. 2005-140627.
Patent Document 5: Japanese Patent No. 3576789.

FIG. 1 shows a coordinate system (Body Frame: B coordinate system) fixed to the body according to a right-hand orthogonal 3-axis system consisting of the direction of vehicle movement ($X_B$ axis) and the lateral direction ($Y_B$ axis) of the body and the vertical direction ($Z_B$ axis) to an $X_B$-$Y_B$ plane. The angular velocity sensor and the acceleration sensor attached to the casing of the car navigation system in such a manner that the sensor detection axis agrees with one of the $X_B$ axis, $Y_B$ axis and $Z_B$ axis detect the angular velocity (roll rate $\omega_{B\text{-}roll}$, pitch rate $\omega_{B\text{-}pitch}$ and yaw rate $\omega_{B\text{-}yaw}$) about the sensor detection axes and the acceleration ($A_{BX}$, $A_{BY}$ and $A_{BZ}$) in the sensor detection axis directions. Incidentally, as for the angular velocity about the sensor detection axes, the clockwise rotation is assumed to be a positive direction and its unit is "rad/s".

FIG. 2 shows a coordinate system (Computer Frame; C coordinate system) with respect to a horizontal plane. For example, when the vehicle is moving along a slope, its body inclines with respect to the horizontal plane, and the sensor detection axis tilts by an angle called an attitude angle of the body (in particular, a body pitch angle $\theta_{C\text{-}pitch}$ and a body roll angle $\theta_{C\text{-}roll}$) so that the sensor is affected by the remaining axes. In particular, as for the acceleration sensor, it is necessary for the signal processing to consider not only the effect of the gravity, but also the effect of driving operation (operation of the accelerator, brake and wheel) and centrifugal force.

FIG. 3 is a diagram for explaining relationships between a sensor mounted angle $\delta\theta_{yaw}$ in the yaw direction and a sensor mounted angle $\delta\theta_{pitch}$ in the pitch direction and the attitude angle with respect to the horizontal plane. Unless the sensor mounted angle in the yaw direction or pitch direction is zero, the sensor detection axis is tilted fixedly. Thus, the sensor is always affected by the remaining axes. Incidentally, the subscript "B" denotes a parameter of the B coordinate system, and likewise the subscript "C" a parameter of the C coordinate system.

Considering the foregoing explanation, the detection accuracy of the position and heading angle of the vehicle is determined by the sensor signal processing ability for the following (1)-(3).

(1) A detecting method of the inclination of the sensor detection axis with respect to the horizontal plane (particularly when using the acceleration sensor).

(2) The effect of the inclination of the sensor detection axis with respect to the horizontal plane has on the angular velocity and acceleration about the sensor detection axis.

(3) Correction of the drift error produced in the sensor.

On the other hand, concerning the foregoing (1) and (2), the techniques disclosed in Patent Document 1-Patent Document 3 carry out only correction of the distance and angular velocity and positioning calculation by limiting to one-sided effect of the sensor output brought about by the inclination of the sensor detection axis caused by the road slope without considering the effect of the body lateral acceleration. For example, when the vehicle makes a turn while running along a slope or makes a high-speed horizontal turn, since the output signal of the acceleration sensor changed by the effect of the lateral acceleration is detected as the effect of the road slope angle, the measuring error of the attitude angle (pitch angle in particular) of the vehicle increases. Accordingly, it is very likely that improper correction of the yaw rate detected by the angular velocity sensor or of the distance of vehicle movement (velocity) detected by the distance sensor occurs, which will bring about reduction in the detection accuracy of the position and heading angle of the vehicle.

On the other hand, as to the foregoing (2), the techniques disclosed in Patent Document 4 and Patent Document 5 detect the angle of inclination and correct the angular velocity taking account of the body lateral acceleration, and thus consider more multifaceted effect of the sensor output than the techniques disclosed in Patent Document 1-Patent Document 3. However, since it does not seem that the foregoing (1) is considered, when the casing of the car navigation system is set in the body in such a manner as to rotate about one of the axes of the B coordinate system, the sensor detection axis is always in a condition of being inclined even if the vehicle is moving on a horizontal plane. For example, when the casing of the car navigation system is set in such a manner as to be rotated in the yaw direction, although the $X_B$ axis acceleration sensor outputs the composite acceleration of the $X_B$ axis acceleration and the $Y_B$ axis acceleration, the techniques disclosed in Patent Document 4 and Patent Document 5 do not consider the fact. Accordingly, they incorrectly detect variations in the $X_B$ axis acceleration due to the $Y_B$ axis acceleration as a road slope angle during a turn, and make improper correction of the yaw rate detected by the angular velocity sensor. Thus, this is very likely to bring about reduction in the detection accuracy of the position and heading angle of the vehicle.

In addition, concerning any one of the techniques of Patent Document 1-Patent Document 5, since drift correction, that of the acceleration sensor in particular, is not carried out properly with respect to the foregoing (3), the detection error of the attitude angle of the vehicle (the pitch angle and roll angle in particular) increases when the drift occurs. Thus, it is very likely to bring about reduction in the detection accuracy of the position and heading angle of the vehicle.

The present invention is implemented to solve the foregoing problems. Therefore it is an object of the present invention to provide a car navigation system capable of measuring the position and heading angle of the vehicle at high accuracy.

DISCLOSURE OF THE INVENTION

To accomplish the object, a car navigation system in accordance with the present invention includes: a distance sensor for outputting a pulse signal corresponding to a distance of vehicle movement by a vehicle; an angular velocity sensor for outputting a signal corresponding to angular velocity having a sensor detection axis in a vertical direction of a casing; an acceleration sensor for outputting a signal corresponding to acceleration having a sensor detection axis in a back and forth direction of the casing on a horizontal plane; a body velocity and acceleration measuring unit for measuring body direction of vehicle movement velocity and body direction of vehicle movement acceleration from the pulse signal delivered from the distance sensor; an angular velocity measuring unit for measuring angular velocity from the signal output from the angular velocity sensor; a body roll angle estimating unit for estimating a body roll angle from the body direction of vehicle movement velocity measured by the body velocity and acceleration measuring unit and from the angular velocity measured by the angular velocity measuring unit; an acceleration sensor output estimating unit for estimating, when the casing is set in the body with a rotation in a yaw direction, the output signal of the acceleration sensor at every prescribed angle in the yaw direction; and a yaw direction mounted angle detecting unit for determining, as a yaw direction mounted angle in the body, an angle at a time when among estimated values evaluated by the acceleration sensor output estimating unit, an estimated value is obtained which agrees most closely with a value remaining after subtracting from the signal output from the acceleration sensor an offset component of the signal.

According to the car navigation system in accordance with the present invention, since it can determine the yaw direction mounted angle of the casing in the body, it can correct the body attitude using the yaw direction mounted angle in the body, thereby being able to measure the position and heading angle of the vehicle at higher accuracy.

BRIEF DESCRIPTION OF THE DRAWINGS

FIG. 1 is a diagram for explaining angular velocity produced about orthogonal three axes of a right-hand system of a car body;

FIG. 2 is a diagram for explaining the angular velocity and attitude angle about each axis with respect to a horizontal plane;

BEST MODE FOR CARRYING OUT THE INVENTION

The best mode for carrying out the invention will now be described with reference to the accompanying drawings to explain the present invention in more detail.

Embodiment 1

Figure 3:
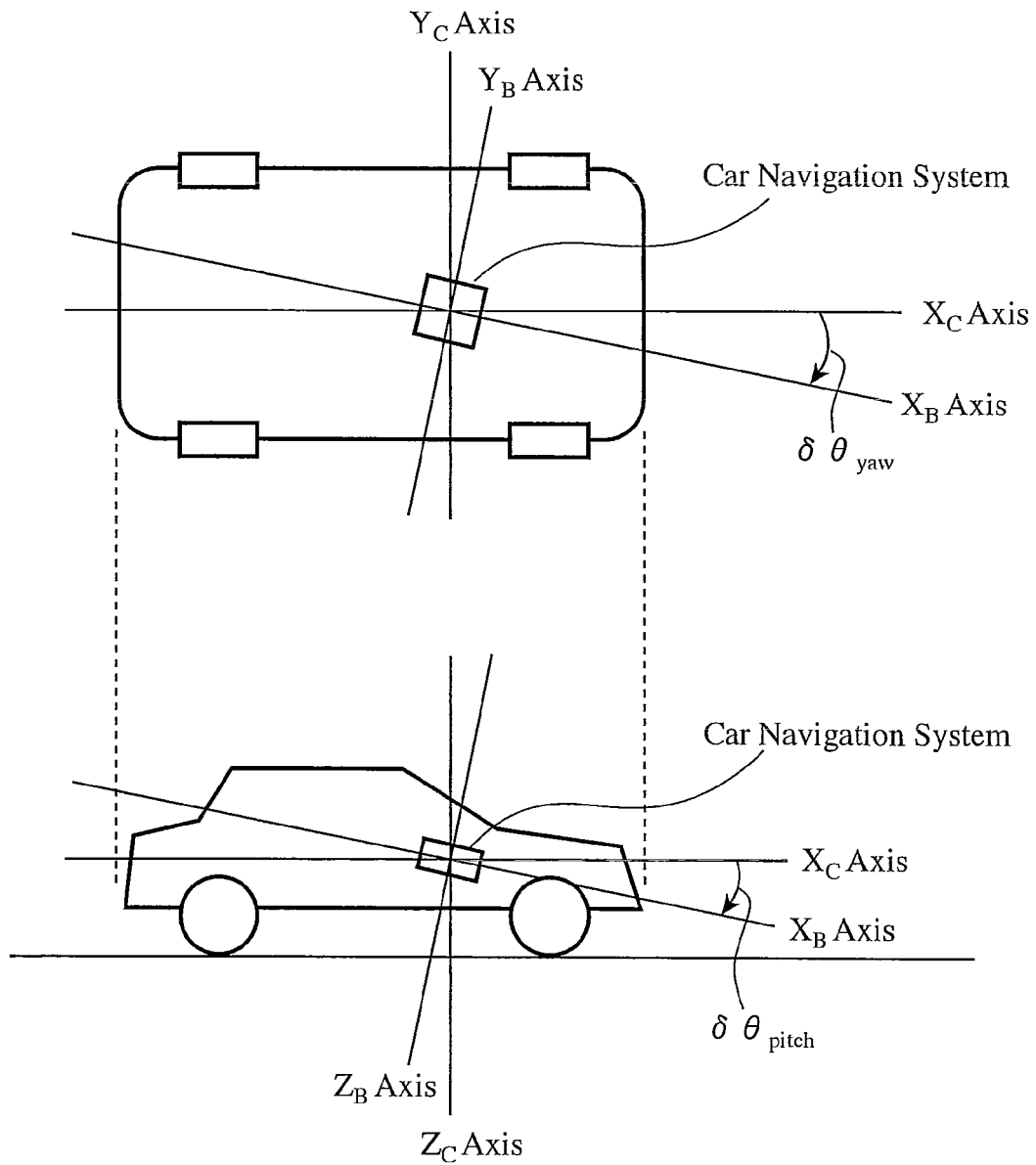
FIG. 3 is a diagram for explaining relationships between the mounted angle in the yaw direction and pitch direction and the attitude angle with respect to the horizontal plane.
Figure 4:
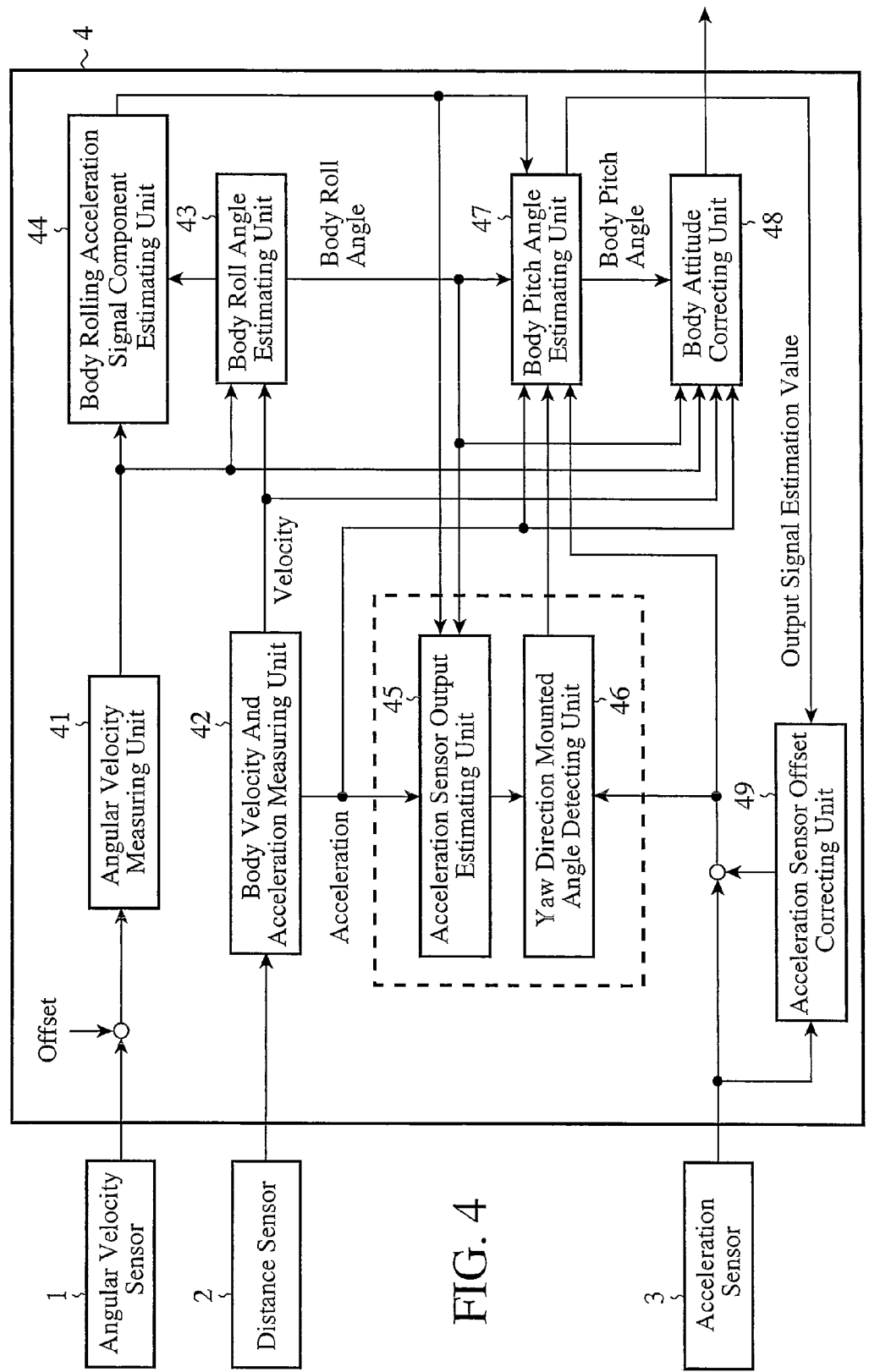
FIG. 4 is a block diagram showing a configuration of a car navigation system of an embodiment 1 in accordance with the present invention centering on a portion relating to body attitude measurement.

FIG. 4 is a block diagram showing a configuration of a car navigation system of an embodiment 1 in accordance with the present invention centering on a portion relating to body attitude measurement. The car navigation system comprises an angular velocity sensor 1, a distance sensor 2, an acceleration sensor 3 and a signal processing unit 4, which are placed in a car navigation casing.

The angular velocity sensor 1 is composed of a gyrocompass, for example, and detects a yaw rate, which is the angular velocity having the sensor detection axis in the vertical direction of the casing, at every prescribed period. A signal corresponding to the angular velocity (yaw rate) output from the angular velocity sensor 1 is delivered to the signal processing unit 4. The distance sensor 2 outputs a pulse signal corresponding to the distance of vehicle movement by the vehicle. The pulse signal output from the distance sensor 2 is delivered to the signal processing unit 4. The acceleration sensor 3 detects the acceleration having the sensor detection axis in the longitudinal direction on a horizontal plane of the casing. The signal corresponding to the acceleration output from the acceleration sensor 3 is delivered to the signal processing unit 4.

The signal processing unit 4 is composed of a computer, for example, and executes processing for fulfilling functions necessary for the car navigation (such as position detection, route search, and route map) in accordance with a control program stored in a memory (not shown) in advance. The signal processing unit 4 includes an angular velocity measuring unit 41, a body velocity and acceleration measuring unit 42, a body roll angle estimating unit 43, a body rolling acceleration signal component estimating unit 44, an acceleration sensor output estimating unit 45, a yaw direction mounted angle detecting unit 46, a body pitch angle estimating unit 47, a body attitude correcting unit 48 and an acceleration sensor offset correcting unit 49, which are composed of the control program.

The angular velocity measuring unit 41 measures the angular velocity on the basis of the signal delivered from the angular velocity sensor 1. The angular velocity measured by the angular velocity measuring unit 41 is delivered to the body roll angle estimating unit 43, body rolling acceleration signal component estimating unit 44 and body attitude correcting unit 48.

The body velocity and acceleration measuring unit 42 measures body direction of vehicle movement velocity and body direction of vehicle movement acceleration on the basis of the pulse signal delivered from the distance sensor 2. The body direction of vehicle movement velocity measured by the body velocity and acceleration measuring unit 42 is delivered to the body roll angle estimating unit 43 and the body direction of vehicle movement acceleration is delivered to the acceleration sensor output estimating unit 45, body pitch angle estimating unit 47 and body attitude correcting unit 48.

The body roll angle estimating unit 43 estimates the body roll angle from the body direction of vehicle movement velocity delivered from the body velocity and acceleration measuring unit 42 and from the angular velocity (yaw rate) delivered from the angular velocity measuring unit 41. The body roll angle estimated by the body roll angle estimating unit 43 is delivered to the body rolling acceleration signal component estimating unit 44, acceleration sensor output estimating unit 45 and body pitch angle estimating unit 47.

The body rolling acceleration signal component estimating unit 44 estimates, from the angular velocity delivered from the angular velocity measuring unit 41 and the body roll angle delivered from the body roll angle estimating unit 43, an acceleration signal component due to a pitch angle component produced by the inclination of the sensor detection axis when the body rolls because of the effect of the acceleration in the lateral direction of the body. The acceleration signal component estimated by the body rolling acceleration signal component estimating unit 44 is delivered to the body pitch angle estimating unit 47 as the body rolling acceleration signal component.

The acceleration sensor output estimating unit 45 estimates the output signal of the acceleration sensor 3 from the body direction of vehicle movement acceleration delivered from the body velocity and acceleration measuring unit 42, and from the body pitch angle produced by the effect of the body roll angle delivered from the body roll angle estimating unit 43 and by the effect of the body rolling delivered from the body rolling acceleration signal component estimating unit 44, at every prescribed angle when the casing is set in the body in such a manner that it is rotated in the yaw direction. The estimated value of the output signal of the acceleration sensor 3 estimated by the acceleration sensor output estimating unit 45 is delivered to the yaw direction mounted angle detecting unit 46.

The yaw direction mounted angle detecting unit 46 specifies, as the yaw direction mounted angle of the casing in the body, the rotation angle in the yaw direction at which the measured value remaining after subtracting from the signal delivered from the acceleration sensor 3 the offset component of that signal agrees most closely with the estimated value output from the acceleration sensor output estimating unit 45. The yaw direction mounted angle in the body specified by the yaw direction mounted angle detecting unit 46 is delivered to the body pitch angle estimating unit 47.

The body pitch angle estimating unit 47 combines, according to the yaw direction mounted angle in the body delivered from the yaw direction mounted angle detecting unit 46, the acceleration sensor signal component of the body direction of vehicle movement acceleration delivered from the body velocity and acceleration measuring unit 42 with the acceleration sensor signal component of the body roll angle delivered from the body roll angle estimating unit 43; and calculates the body pitch angle from the signal remaining after subtracting the composite component from the output signal of the acceleration sensor 3. The body pitch angle calculated by the body pitch angle estimating unit 47 is delivered to the body attitude correcting unit 48.

The body attitude correcting unit 48, using the body pitch angle delivered from the body pitch angle estimating unit 47 and the body roll angle delivered from the body roll angle estimating unit 43, converts the angular velocity (yaw rate) about the sensor detection axis, and the acceleration, velocity and distance in the body direction of vehicle movement to the angular velocity (yaw rate) about the vertical axis, and the acceleration, velocity and distance in the direction of vehicle movement on the horizontal plane.

The acceleration sensor offset correcting unit 49 corrects the offset of the acceleration sensor 3 using the temporary offset, which is the value (temporary offset) remaining after subtracting the output signal estimated value of the body pitch angle estimating unit 47 from the output signal of the acceleration sensor 3, when the temporary offset continues to stay within a prescribed range more than a prescribed distance or a prescribed angle.

Incidentally, the acceleration sensor output estimating unit 45 and the yaw direction mounted angle detecting unit 46 operate when the mounted angle in the body in the yaw direction has not yet been detected; and the body pitch angle estimating unit 47, body attitude correcting unit 48 and acceleration sensor offset correcting unit 49 operate when the mounted angle in the body in the yaw direction has been detected.

Figure 5:
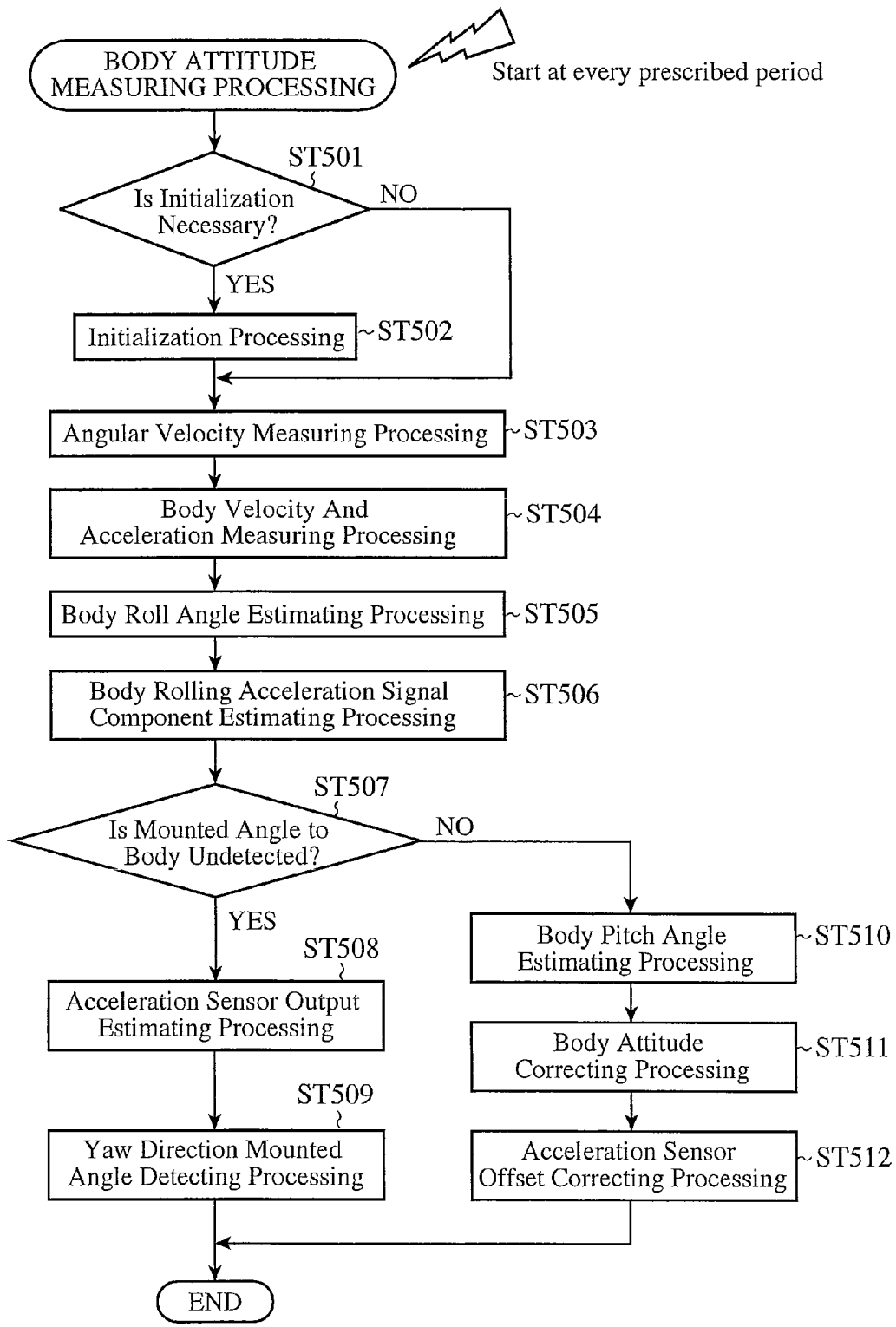
FIG. 5 is a flowchart showing the operation of the car navigation system of the embodiment 1 in accordance with the present invention centering on body attitude measuring processing.

Next, the operation of the car navigation system of the embodiment 1 in accordance with the present invention will be described with reference to the flowchart shown in FIG. 5 centering on the body attitude measuring processing. The body attitude measuring processing is started at every prescribed period.

In the body attitude measuring processing, a check is made whether it is necessary to initialize the control program installed in the signal processing unit 4 or not, first (step ST501). The initialization becomes necessary when electric power comes to be supplied to the car navigation system by starting the engine of the vehicle. When a decision is made at step ST501 that the initialization is necessary, initialization processing is executed (step ST502). More specifically, the individual control programs installed in the signal processing unit 4 are initialized. When a decision is made at the foregoing step ST501 that the initialization is unnecessary, the processing at step ST502 is skipped.

Subsequently, angular velocity measuring processing is executed (step ST503). More specifically, the angular velocity measuring unit 41 measures the angular velocity $\omega_{B\text{-}yaw}$ about the sensor detection axis on the basis of the signal corresponding to the angular velocity (yaw rate) delivered from the angular velocity sensor 1 at every prescribed period, and delivers it to the body roll angle estimating unit 43, body rolling acceleration signal component estimating unit 44 and body attitude correcting unit 48.

Subsequently, body velocity and acceleration measuring processing is executed (step ST504). More specifically, the body velocity and acceleration measuring unit 42 measures body direction of vehicle movement velocity $V_{BX}$ and body direction of vehicle movement acceleration $A_{BX}$ on the basis of the pulse signal delivered from the distance sensor 2 during a prescribed period. The body direction of vehicle movement velocity $V_{BX}$ measured by the body velocity and acceleration measuring unit 42 is delivered to the body roll angle estimating unit 43, and the body direction of vehicle movement acceleration $A_{BX}$ is delivered to the acceleration sensor output estimating unit 45, body pitch angle estimating unit 47 and body attitude correcting unit 48.

Subsequently, body roll angle estimating processing is executed (step ST505). More specifically, the body roll angle estimating unit 43, using the body direction of vehicle movement velocity $V_{BX}$ delivered from the body velocity and acceleration measuring unit 42 and the angular velocity (yaw rate) $\omega_{B\text{-}yaw}$ delivered from the angular velocity measuring unit 41, calculates the turning radius R[m], body lateral acceleration $A_{BY}$ [m/s$^2$] and body roll angle $\theta_{C\text{-}roll}$ [rad] of the vehicle successively by executing the following equations (1)-(3) successively. The body roll angle $\theta_{C\text{-}roll}$ calculated by the body roll angle estimating unit 43 is delivered to the body rolling acceleration signal component estimating unit 44, acceleration sensor output estimating unit 45 and body pitch angle estimating unit 47.

$$R = V_{BX} / |\omega_{B\text{-}yaw}| \tag{1}$$

$$A_{BY} = \omega_{B\text{-}yaw}^2 R \quad (\omega_{B\text{-}yaw} \geq 0) \tag{2}$$
$$= -\omega_{B\text{-}yaw}^2 R \quad (\omega_{B\text{-}yaw} < 0)$$

$$\theta_{C\text{-}roll} = \sin^{-1}(A_{BY}/G) \tag{3}$$

where G is the gravity acceleration [m/s$^2$].

Subsequently, body rolling acceleration signal component estimating processing is executed (step ST506). More specifically, the body rolling acceleration signal component estimating unit 44, using the angular velocity (yaw rate) $\omega_{B\text{-}yaw}$ delivered from the angular velocity measuring unit 41 and the body roll angle $\theta_{C\text{-}roll}$ delivered from the body roll angle estimating unit 43, calculates according to the following equation (4) the body pitch angle $\Delta\theta_{C\text{-}roll>pitch}$ [rad] caused by the body rolling effect, and delivers it to the body pitch angle estimating unit 47.

$$\Delta\theta_{C\text{-}roll\to pitch} = -2\omega_{B\text{-}yaw}\sin(\theta_{C\text{-}roll}) \tag{4}$$

Subsequently, a check is made whether the mounted angle in the body in the yaw direction is not yet detected (step ST507). When a decision is made at step ST507 that the mounted angle in the body in the yaw direction is not yet detected, then acceleration sensor output estimating processing is executed (step ST508). More specifically, the acceleration sensor output estimating unit 45 calculates an acceleration sensor output signal component $\Delta S_{C\text{-}drive}$ [mV] produced from the body direction of vehicle movement acceleration $A_{BX}$, an acceleration sensor output signal component $\Delta S_{C\text{-}roll\to pitch}$ [mV] produced from the body pitch angle $\Delta\theta_{C\text{-}roll\to pitch}$ caused by the body rolling effect, and the output signal $\Delta S_{C\text{-}roll}$ [mV] of the acceleration sensor 3 at a time when the acceleration sensor 3 is rotated 90 degrees and detects the body roll angle as the body pitch angle successively using the following equation (5) to equation (7). After that, the acceleration sensor output estimating unit 45 calculates at every prescribed angle the estimated value $\Delta S_{prs\text{-}est}$ [mV] of the output signal of the acceleration sensor 3 in the case where the casing is set in the body with a rotation in the yaw direction using the following equation (8), and delivers it to the yaw direction mounted angle detecting unit 46. The foregoing $\Delta\theta_{C\text{-}roll\rightarrow pitch}$ and $\Delta S_{C\text{-}roll\rightarrow pitch}$ are the body pitch angle [deg] caused by the body rolling effect and the acceleration sensor output signal component [mV], which are the same component though their units differ.

$$\Delta S_{C\text{-}drive}=(A_{BX}/G)SF_{prs} \quad (5)$$

$$\Delta S_{C\text{-}roll\rightarrow pitch}=-G\sin(\Delta\theta_{C\text{-}roll\rightarrow pitch})SF_{prs} \quad (6)$$

$$\Delta S_{C\text{-}roll}=G\sin(\theta_{C\text{-}roll})SF_{prs} \quad (7)$$

$$\Delta S_{prs\text{-}est}=(\Delta S_{C\text{-}drive}+\Delta S_{pitch\rightarrow roll})\cos(\delta\theta_{C\text{-}yaw})+\Delta S_{C\text{-}roll}\sin(\delta\theta_{C\text{-}yaw}) \quad (8)$$

where $SF_{prs}$ is a scale factor [mV/G] of the acceleration sensor 3.

Subsequently, yaw direction mounted angle detecting processing is executed (step ST509). More specifically, the yaw direction mounted angle detecting unit 46 compares the measured value $\Delta S_{prs\text{-}mes}$ [mV], which remains after subtracting from the signal delivered from the acceleration sensor 3 its offset component, with the estimated value $\Delta S_{prs\text{-}est}$ [mV] calculated by the acceleration sensor output estimating unit 45 using the equation (8) at every prescribed angle, and records compared results over a prescribed section at every prescribed angle. When the compared results over the prescribed section have been all collected, the yaw direction mounted angle detecting unit 46 specifies the yaw direction mounted angle in the body $\delta\theta_{C\text{-}yaw}$ [rad] used when the estimated value $\Delta S_{prs\text{-}est}$ that most closely agrees with the measured value $\Delta S_{prs\text{-}mes}$ is calculated, and delivers it to the body pitch angle estimating unit 47 together with the estimated value $\Delta S_{prs\text{-}est}$. Then, after memorizing that the mounted angle in the body has been detected, it completes the body attitude measuring processing. In addition, unless the compared results over the prescribed section have been all collected, it memorizes for the next comparison that the mounted angle in the body is not yet detected, and completes the body attitude measuring processing.

If a decision is made at the foregoing step ST507 that the mounted angle in the body in the yaw direction has been detected, then body pitch angle estimating processing is executed (step ST510). More specifically, the body pitch angle estimating unit 47, using the estimated value $\Delta S_{prs\text{-}est}$ of the output signal of the acceleration sensor 3, which is calculated using the foregoing equation (8) and is delivered from the yaw direction mounted angle detecting unit 46, and the measured value $\Delta S_{prs\text{-}mes}$, calculates the body pitch angle $\theta_{C\text{-}pitch}$ [rad] by the following equation (9), and delivers it to the body attitude correcting unit 48.

$$\theta_{C\text{-}pitch}=\sin^{-1}\{(\Delta S_{prs\text{-}mes}-\Delta S_{prs\text{-}est})/SF_{prs}\} \quad (9)$$

Subsequently, body attitude correcting processing is executed (step ST511). More specifically, the body attitude correcting unit 48, using the body roll angle $\theta_{C\text{-}roll}$ delivered from the body roll angle estimating unit 43 and the body pitch angle $\theta_{C\text{-}pitch}$ delivered from the body pitch angle estimating unit 47, converts the angular velocity (yaw rate) $\omega_{B\text{-}yaw}$ about the sensor detection axis delivered from the angular velocity measuring unit 41 to the angular velocity $\omega_{C\text{-}yaw}$ [rad] about the vertical axis by the equation (10), converts the body direction of vehicle movement velocity $V_{BX}$ to the velocity $V_{CX}$ on the horizontal plane by the equation (11), and then outputs them. In the following equation (10), $\Delta t$ is the prescribed period [s]. When converting the distance or acceleration in the body direction of vehicle movement to the distance or acceleration on the horizontal plane, an equation similar to the equation (11) is used.

$$\omega_{C\text{-}yaw}=\{(\theta_{C\text{-}pitch}/\Delta t)\sin\theta_{C\text{-}roll}+\omega_{B\text{-}yaw}\cos\theta_{C\text{-}roll}\}/\cos\theta_{C\text{-}pitch} \quad (10)$$

$$V_{CX}=V_{BX}\cos\theta_{C\text{-}pitch} \quad (11)$$

Subsequently, acceleration sensor offset correcting processing is executed (step ST512). More specifically, when the value (temporary offset) remaining after subtracting from the output signal of the acceleration sensor 3 the output signal estimated value calculated by the body pitch angle estimating unit 47 using the equation (8) continues to stay within the prescribed range more than the prescribed distance or prescribed angle, the acceleration sensor offset correcting unit 49 considers that the effect of the body pitch angle on a slope is small, and completes the body attitude measuring processing after correcting the offset of the acceleration sensor using the temporary offset. When the temporary offset does not stay within the prescribed range, or continues to stay within the prescribed range less than the prescribed distance or prescribed angle, the acceleration sensor offset correcting unit 49 makes a decision that it cannot correct the offset of the acceleration sensor, and completes the body attitude measuring processing.

As described above, according to the car navigation system of the embodiment 1 in accordance with the present invention, even when its casing is set in the car body with the rotation in the yaw direction, it can estimate the output signal of the acceleration sensor in the body direction of vehicle movement with the existing sensor configuration (a combination of the distance sensor, angular velocity sensor and acceleration sensor). Accordingly, it can automatically determine the yaw direction mounted angle in the body by searching for the estimated value most closely agrees with the measured value as to the output signal of the acceleration sensor. Thus, even when the car navigation system is set in the car body with the rotation in the yaw direction, the present embodiment 1 can eliminate the conventional problem of mismeasuring the body attitude such as the angular velocity and acceleration using the sensor signals affected by the remaining axes.

In addition, for the reason that the casing is set in the body with a rotation in the yaw direction, even if the body lateral direction acceleration component is superimposed on the output signal of the acceleration sensor in the body direction of vehicle movement, or even if the acceleration component in the body direction of vehicle movement attenuates, it becomes possible to detect the pitch angle precisely from the output signal of the acceleration sensor, and to detect the angular velocity (yaw rate) about the vertical axis, and the acceleration, velocity and distance in the direction of vehicle movement on the horizontal plane correctly. More specifically, since the present embodiment 1 can automatically correct the effect of the inclination of the sensor detection axis on the body attitude in accordance with the result of the automatic detection of the yaw direction mounted angle of car navigation system in the body, it can eliminate the conventional problem of mismeasuring the body attitude such as the angular velocity and acceleration when the car navigation system is set in the body with a rotation in the yaw direction by using the sensor signal affected by the remaining axes.

Furthermore, the present embodiment 1 calculates, even if the car body inclines in the lateral direction because of the centrifugal force, the body pitch angle by estimating the acceleration signal component due to the body rolling.

Accordingly, when the vehicle is moving along a slope making a turn, or makes a high speed turn on a horizontal plane, the present embodiment 1 can prevent the incorrect detection of the body pitch angle and the detection accuracy reduction of the position and heading angle of the vehicle. More specifically, since it can measure the body attitude more precisely by conducting the correcting calculation of the inertial force applied to the acceleration sensor on the basis of the principle, it can not only correct the effect of the mounted angle of the car navigation system in the body, but also eliminate the conventional problem of bringing about the reduction of the detection accuracy of the position and heading angle of the vehicle when the vehicle is moving along a slope making a turn, or makes a high speed turn on a horizontal plane.

Moreover, after completing the detection of the mounted angle of the casing in the body, when the value (temporary offset) remaining after subtracting from the acceleration sensor output signal the output signal estimated value continues to stay within the prescribed range more than the prescribed distance or prescribed angle, the present embodiment 1 corrects the offset of the acceleration sensor using the temporary offset. Accordingly, it can always detect and correct the drift caused in the acceleration sensor, and measure the attitude angle of the body and the distance of vehicle movement and velocity on the horizontal plane accurately. More specifically, the present embodiment 1 extracts and corrects the drift error more precisely by deciding the inclination of the sensor detection axis with respect to the horizontal plane and by removing the inertial force component superimposed on the signal of the angular velocity sensor or acceleration sensor even when the vehicle is moving, thereby improving the measuring accuracy of the body attitude. As a result, it can eliminate the conventional problem of bringing about the reduction in the measuring accuracy of the body attitude unless it can correct the drift error sufficiently which is caused in the angular velocity sensor or acceleration sensor the car navigation system employs.

Embodiment 2

The car navigation system of the foregoing embodiment 1 is configured in such a manner as to perform the detection of the mounted angle in the body and the correction of the body attitude when the casing is set in the body with a rotation in the yaw direction. In contrast, the car navigation system of the embodiment 2 is configured in such a manner as to perform the detection of the mounted angle in the body and the correction of the body attitude when the casing is set in the body with a tilt in the pitch direction. In the following, the description of the same portions as those of the embodiment 1 is omitted or simplified centering on the description of different portions.

Figure 6:
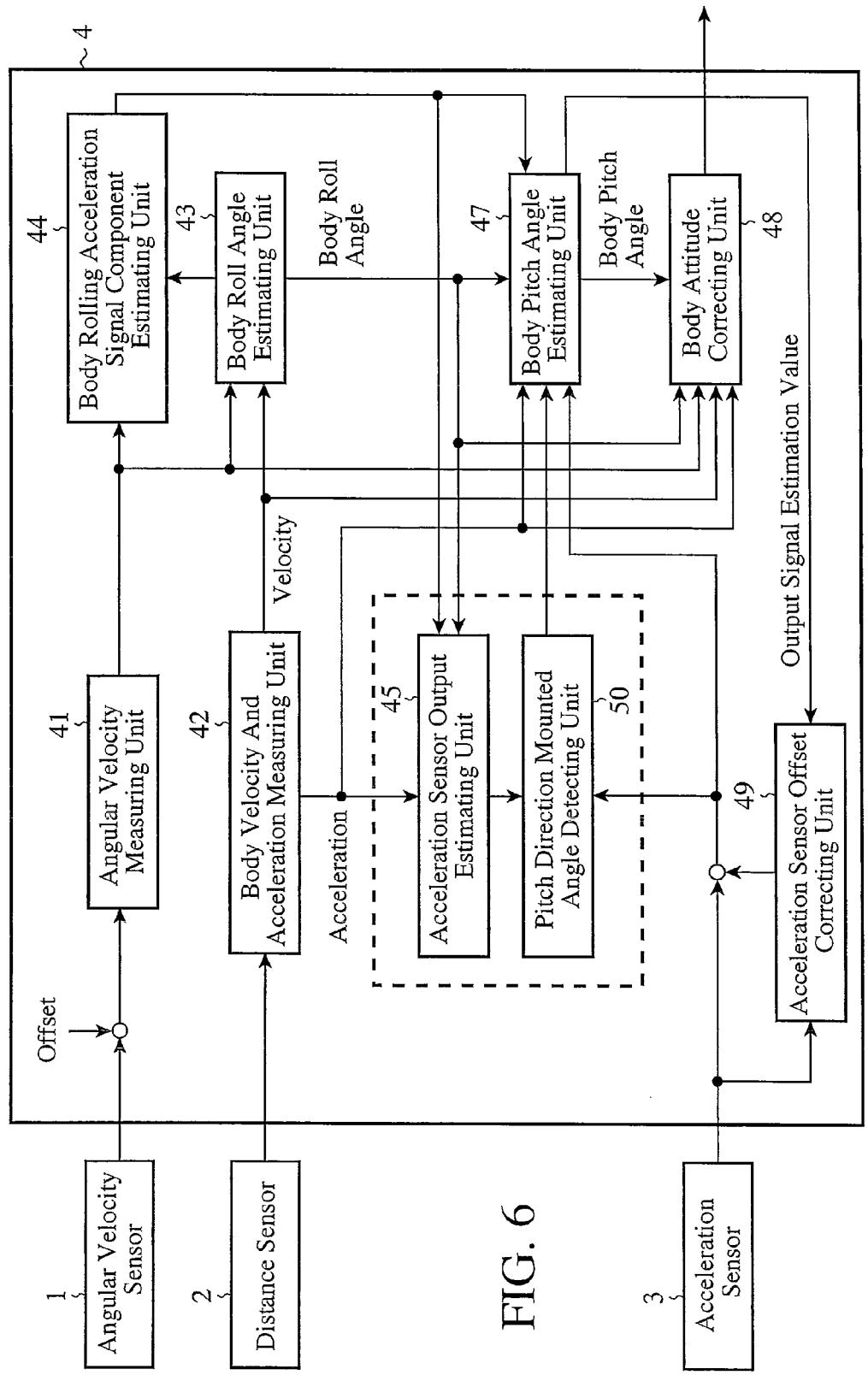
FIG. 6 is a block diagram showing a configuration of a car navigation system of an embodiment 2 in accordance with the present invention centering on a portion relating to body attitude measurement.

FIG. 6 is a block diagram showing a configuration of the car navigation system of the embodiment 2 in accordance with the present invention centering on portions relating to the body attitude measurement. The car navigation system is configured by replacing the yaw direction mounted angle detecting unit 46 by a pitch direction mounted angle detecting unit 50 of the car navigation system of the embodiment 2.

The acceleration sensor output estimating unit 45 and the pitch direction mounted angle detecting unit 50 operate when the mounted angle in the body in the pitch direction is not yet detected. The body pitch angle estimating unit 47, body attitude correcting unit 48 and acceleration sensor offset correcting unit 49 operate when the mounted angle in the body in the pitch direction has been detected.

Figure 7:
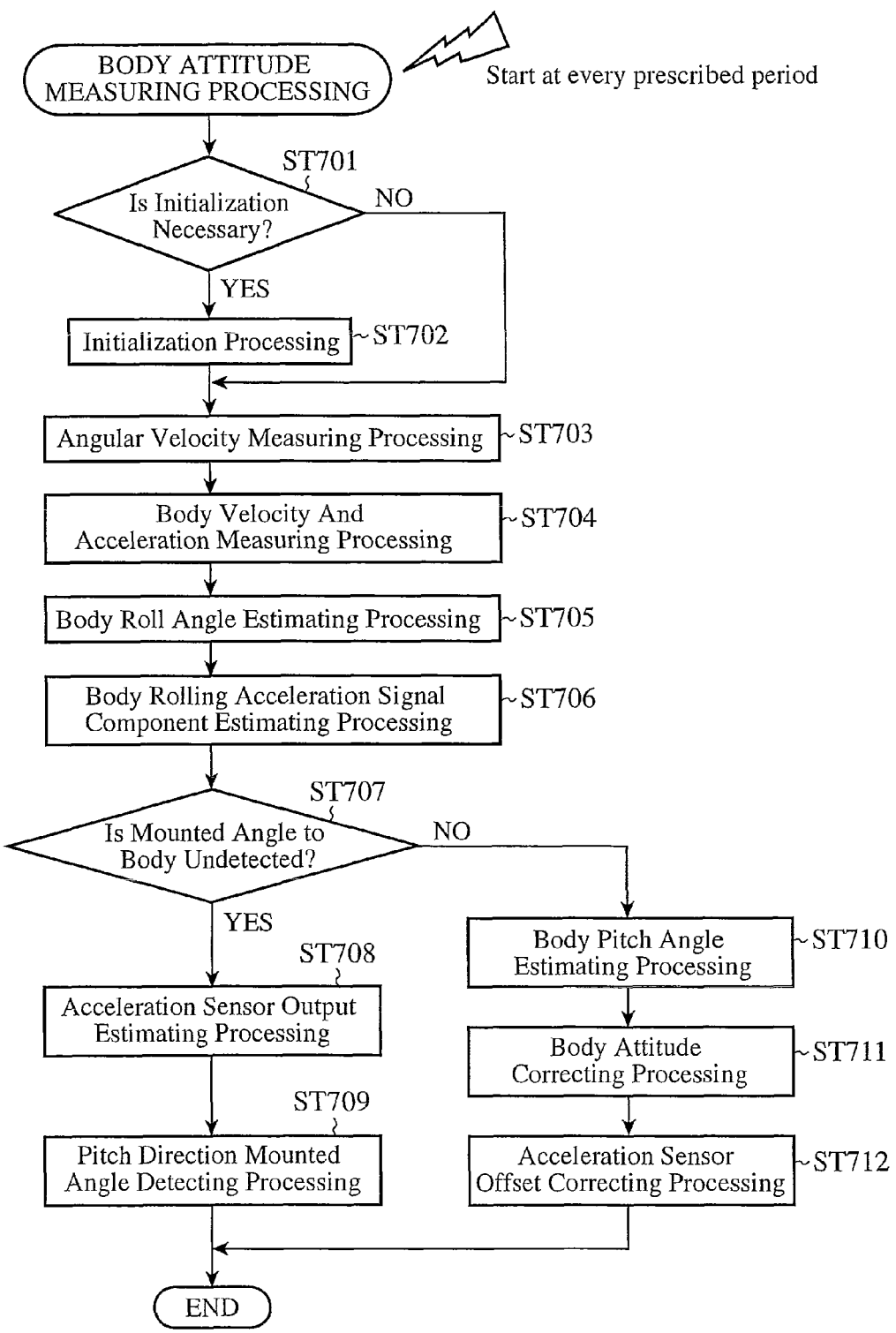
FIG. 7 is a flowchart showing the operation of the car navigation system of the embodiment 2 in accordance with the present invention centering on body attitude measuring processing.

Next, the operation of the car navigation system of the embodiment 2 in accordance with the present invention with the foregoing configuration will be described with reference to the flowchart shown in FIG. 7 centering on the body attitude measuring processing. The body attitude measuring processing is started at every prescribed period.

In the body attitude measuring processing, a check is made whether it is necessary to initialize the control program installed in the signal processing unit 4 or not, first (step ST701). When a decision is made at step ST701 that the initialization is necessary, initialization processing is executed (step ST702). When a decision is made at the foregoing step ST701 that the initialization is unnecessary, the processing at step ST702 is skipped. The processing at step ST701 and step ST702 is the same as the processing at step ST501 and step ST502 of the flowchart shown in FIG. 5.

Subsequently, the angular velocity measuring processing is executed (step ST703). More specifically, the angular velocity measuring unit 41 measures the angular velocity $\omega_{B-yaw}$ about the sensor detection axis on the basis of the signal corresponding to the angular velocity (yaw rate) delivered from the angular velocity sensor 1 at every prescribed period, and calculates the body heading angle $\omega_{B-yaw}$ by carrying out a time integral of the angular velocity $\omega_{B-yaw}$.

Subsequently, the body velocity and acceleration measuring processing is executed (step ST704). More specifically, the body velocity and acceleration measuring unit 42 measures the body direction of vehicle movement distance of vehicle movement $L_{BX}$, body direction of vehicle movement velocity $V_{BX}$ and body direct ion of vehicle movement acceleration $A_{BX}$ on the basis of the pulse signal delivered from the distance sensor 2 during a prescribed period.

Subsequently, the body roll angle estimating processing is executed (step ST705). The processing at step ST705 is the same as the processing at step ST505 of the flowchart shown in FIG. 5. Subsequently, the body rolling acceleration signal component estimating processing is executed (step ST706). The processing at step ST706 is the same as the processing at step ST506 of the flowchart shown in FIG. 5.

Subsequently, a check is made whether the mounted angle in the body in the pitch direction is not yet detected (step ST707). When a decision is made at step ST707 that the mounted angle in the body in the pitch direction is not yet detected, then the acceleration sensor output estimating processing is executed (step ST708). More specifically, using the foregoing equation (5) and equation (6), the acceleration sensor output estimating unit 45 calculates the acceleration sensor output signal component $\Delta S_{C\text{-}drive}$ [mV] produced from the body direction of vehicle movement acceleration $A_{BX}$, and the acceleration sensor output signal component $\Delta S_{C\text{-}roll \to pitch}$ [mV] produced from the body pitch angle $\Delta \theta_{C\text{-}roll \to pitch}$ caused by the body rolling effect successively. After that, the acceleration sensor output estimating unit 45 calculates the estimated value $\Delta S_{prs\text{-}est}$ [mV] of the output signal of the acceleration sensor 3 when the casing is set in the body with a rotation in the pitch direction at every prescribed angle using the following equation (12), and delivers it to the pitch direction mounted angle detecting unit 50. The foregoing $\Delta \theta_{C\text{-}roll \to pitch}$ and $\Delta S_{C\text{-}roll \to pitch}$ are the body pitch angle [deg] caused by the body rolling effect and the acceleration sensor output signal component [mV], which are the same component though their units differ.

$$\Delta S_{prs\text{-}est} = \Delta S_{C\text{-}drive} + \Delta S_{pitch \to roll} \qquad (12)$$

Subsequently, pitch direction mounted angle detecting processing is executed (step ST709). More specifically, when the difference between the measured value $\Delta S_{prs\text{-}mes}$ [mV]

remaining after subtracting the offset component from the signal delivered from acceleration sensor 3 and the estimated value $\Delta S_{prs\text{-}est}$ [mV] calculated by the acceleration sensor output estimating unit 45 using equation (12) falls within a prescribed range, the pitch direction mounted angle detecting unit 50 retains the next data (such as the output signal of the acceleration sensor 3, the estimated value $\Delta S_{prs\text{-}est}$ calculated by equation (12), the body heading angle $\theta_{B\text{-}yaw}$, the body direction of vehicle movement distance of vehicle movement $L_{BX}$, and time) in its history as a single record.

Then, when the pitch direction mounted angle detecting unit 50 can confirm in the plurality of records of the history that the vehicle moves more than a prescribed distance or prescribed angle, and when the difference (temporary offset) between the estimated values $\Delta S_{prs\text{-}est}$ calculated from the output signal of the acceleration sensor 3 in the plurality of records using equation (12) is within a prescribed value, the pitch direction mounted angle detecting unit 50 makes a decision that the vehicle is moving on the horizontal plane and that the pitch direction mounted angle in the body can be detected, calculates the pitch direction mounted angle $\delta\theta_{C\text{-}pitch}$ of the casing in the body from the average of the difference between the offset reference value $\Delta S_{prs\text{-}of\text{-}typ}$ and the temporary offset $\Delta S_{prs\text{-}of\text{-}kari}$ in the plurality of records according to the following equation (13), and completes the body attitude measuring processing after delivering it to the body pitch angle estimating unit 47.

$$\delta\theta_{C\text{-}pitch} = a\sin^{-1}\{(\Delta S_{prs\text{-}of\text{-}kari} - \Delta S_{prs\text{-}of\text{-}typ})/SF_{prs}\} \qquad (13)$$

On the other hand, consider the case where the difference between the measured value $\Delta S_{prs\text{-}mes}$ and the estimated value $\Delta S_{prs\text{-}est}$ does not fall within the prescribed range. In this case, unless it can be confirmed in the plurality of records of the history that the vehicle moves more than the prescribed distance or prescribed angle, and if it is decided from the output signal of the acceleration sensor 3 in the plurality of records that the difference between the estimated values $\Delta S_{prs\text{-}est}$ (temporary offset) exceeds the prescribed value, since a decision cannot be made that the vehicle was moving on the horizontal plane, the body attitude measuring processing is completed.

If it is decided at the foregoing step ST707 that the mounted angle in the body in the pitch direction has been detected, then the body pitch angle estimating processing is executed (step ST710). More specifically, the body pitch angle estimating unit 47, using the estimated value $\Delta S_{prs\text{-}est}$ of the output signal of the acceleration sensor 3, which is calculated using the foregoing equation (8) and is delivered from the pitch direction mounted angle detecting unit 50, and the measured value $\Delta S_{prs\text{-}mes}$, calculates the body pitch angle $\theta_{C\text{-}pitch}$ [rad] by the following equation (14), and delivers it to the body attitude correcting unit 48.

$$\theta_{C\text{-}pitch} = \sin^{-1}\{(\Delta S_{prs\text{-}mes} - \Delta S_{prs\text{-}est})/SF_{prs}\} - \delta\theta_{C\text{-}pitch} \qquad (14)$$

Subsequently, the body attitude correcting processing is executed (step ST711). The processing at step ST711 is the same as the processing at step ST511 of the flowchart shown in FIG. 5. Subsequently, the acceleration sensor offset correcting processing is executed (step ST712). The processing at step ST712 is the same as the processing at step ST512 of the flowchart shown in FIG. 5. Thus, the body attitude measuring processing is completed.

As described above, according to the car navigation system of the embodiment 2 in accordance with the present invention, even when its casing is set in the car body with the tilt in the pitch direction, it can extract the output signal of the acceleration sensor in the body direction of vehicle movement with the existing sensor configuration (the combination of the distance sensor, angular velocity sensor and acceleration sensor). Accordingly, it can automatically determine the pitch direction mounted angle in the body from the difference between the offset reference value and the output signal of the acceleration sensor. Thus, when the car navigation system is set in the car body with the tilt in the pitch direction, the present embodiment 2 can eliminate the conventional problem of mismeasuring the body attitude such as the angular velocity or acceleration using the sensor signals affected by the remaining axes.

In addition, even if a fixed error component is superimposed on the output signal of the acceleration sensor because the casing is set in the body with a tilt in the pitch direction, the present embodiment 2 combines the acceleration sensor signal component of the body direction of vehicle movement acceleration and the acceleration sensor signal component of the body roll angle, and calculates the body pitch angle from the component remaining after subtracting the composite acceleration from the output signal of the acceleration sensor, thereby being able to detect the angular velocity (yaw rate) about the vertical axis, and the acceleration, velocity and distance in the direction of vehicle movement on the horizontal plane correctly. More specifically, since the present embodiment 2 can automatically correct the effect of the tilt of the sensor detection axis on the body attitude in accordance with the result of the automatic detection of the pitch direction mounted angle of car navigation system in the body, it can eliminate the conventional problem of mismeasuring the body attitude such as the angular velocity and acceleration when the car navigation system is set in the body with a tilt in the pitch direction by using the sensor signal affected by the remaining axes.

Furthermore, the present embodiment 2 calculates, even if the car body inclines in the lateral direction because of the centrifugal force, the body pitch angle by estimating the acceleration signal component due to the body rolling. Accordingly, when the vehicle is moving along a slope making a turn, or makes a high speed turn on a horizontal plane, the present embodiment 2 can prevent the incorrect detection of the body pitch angle and the detection accuracy reduction of the position and heading angle of the vehicle. More specifically, since it can measure the body attitude more precisely by conducting the correcting calculation of the inertial force applied to the acceleration sensor on the basis of the principle, it can not only correct the effect of the mounted angle of the car navigation system in the body, but also eliminate the conventional problem of bringing about the reduction of the detection accuracy of the position and heading angle of the vehicle when the vehicle is moving along a slope making a turn, or makes a high speed turn on the horizontal plane.

Moreover, after completing the detection of the mounted angle of the casing in the body, when the value (temporary offset) remaining after subtracting from the acceleration sensor output signal the output signal estimated value continues to stay within the prescribed range more than the prescribed distance or prescribed angle, the present embodiment 2 corrects the offset of the acceleration sensor using the temporary offset. Accordingly, it can always detect and correct the drift caused in the acceleration sensor, and measure the attitude angle of the body and the distance of vehicle movement and velocity on the horizontal plane accurately. More specifically, the present embodiment 2 extracts and corrects the drift error more precisely by deciding the tilt of the sensor detection axis with respect to the horizontal plane and by removing the inertial force component superimposed on the signal of the angular velocity sensor or acceleration sensor even when the vehicle is moving, thereby improving the measuring accuracy of the body attitude. As a result, it can eliminate the conventional problem of bringing about the reduction in the measuring accuracy of the body attitude unless it can correct the drift error sufficiently which occurs in the angular velocity sensor or acceleration sensor the car navigation system employs.

Embodiment 3

The car navigation system of the foregoing embodiment 1 is configured in such a manner as to perform the detection of the mounted angle in the body and correction of the body attitude when the casing is set in the body with a rotation in the yaw direction, and the car navigation system of the embodiment 2 is configured in such a manner as to perform the detection of the mounted angle in the body and correction of the body attitude when the casing is set in the body with a tilt in the pitch direction. In contrast, the car navigation system of the embodiment 3 is configured in such a manner as to perform the detection of the mounted angle in the body and correction of the body attitude when the casing is set in the body with a rotation in the yaw direction and with a tilt in the pitch direction. In the following, description of the same portions as those of the embodiment 1 and embodiment 2 is omitted centering on the description of different portions.

Figure 8:
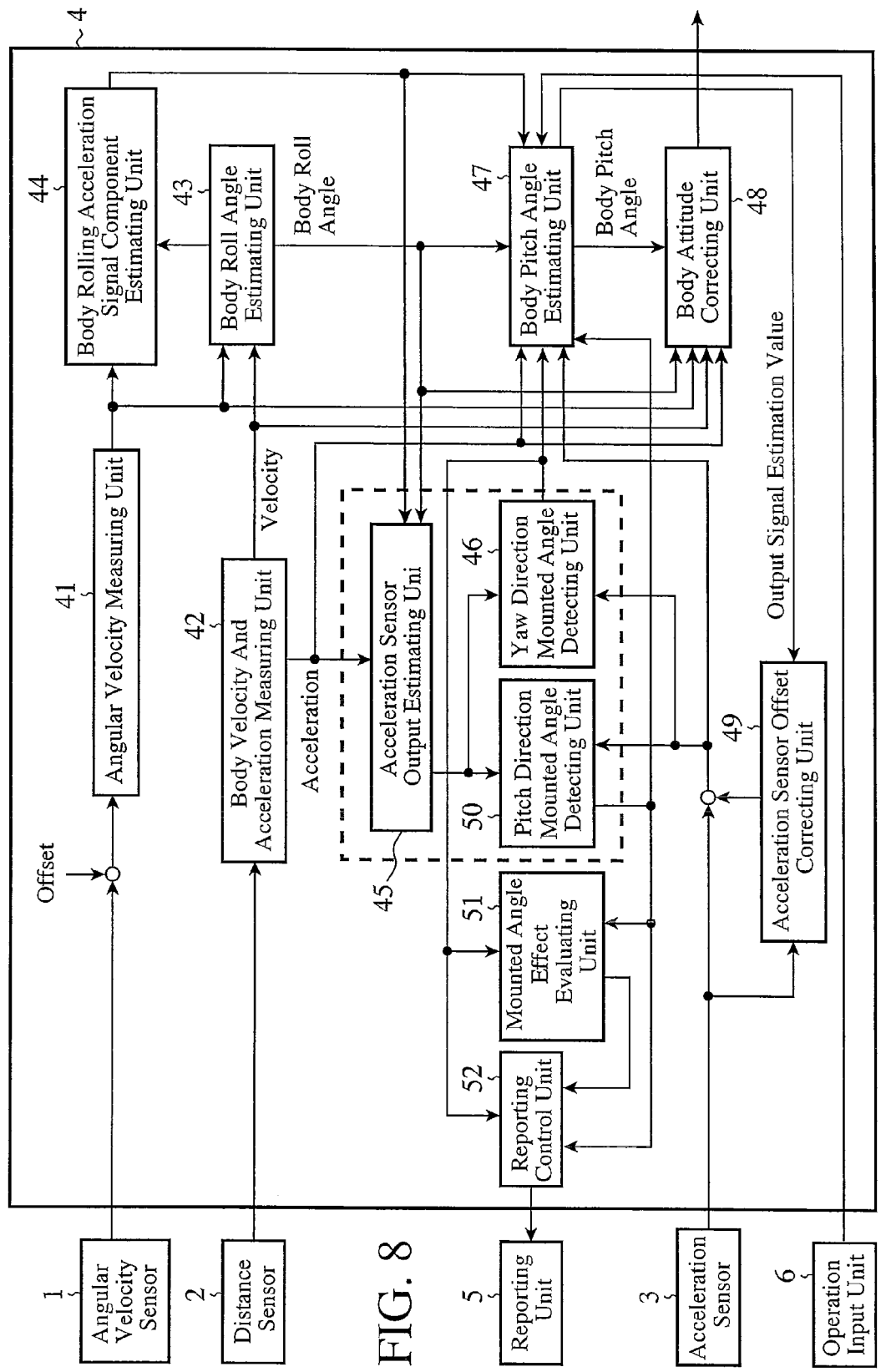
FIG. 8 is a block diagram showing a configuration of a car navigation system of an embodiment 3 i in accordance with the present invention centering on a portion relating to body attitude measurement.

FIG. 8 is a block diagram showing a configuration of the car navigation system of the embodiment 3 in accordance with the present invention centering on portions relating to the body attitude measurement. The car navigation system is configured by adding a reporting unit 5 and an operation input unit 6 to the car navigation system of the embodiment 1, and by adding a pitch direction mounted angle detecting unit 50, a mounted angle effect evaluating unit 51 and a reporting control unit 52 to the signal processing unit 4 of the embodiment 1.

The reporting unit 5 can be composed of a monitor of the car navigation system, for example. The reporting unit 5 displays a telop and soft buttons under the control of the signal processing unit 4. The operation input unit 6 can be composed of a touch panel on the monitor of the car navigation system, for example, and touching a soft button formed on the monitor screen enables input. The data input from the operation input unit 6 is delivered to the signal processing unit 4. The pitch direction mounted angle detecting unit 50 is the same as that of the car navigation system of the embodiment 2.

The mounted angle effect evaluating unit 51 evaluates the effect of the mounted angle in the body on the basis of the yaw direction mounted angle in the body $\delta\theta_{C\text{-}yaw}$ from the yaw direction mounted angle detecting unit 46 and the pitch direction mounted angle in the body $\delta\theta_{C\text{-}pitch}$ from the pitch direction mounted angle detecting unit 50, and delivers the evaluation result to the reporting control unit 52. The reporting control unit 52 generate the telop which will be described later from the yaw direction mounted angle in the body $\delta_{C\text{-}yaw}$ from the yaw direction mounted angle detecting unit 46, the pitch direction mounted angle in the body $\delta\theta_{C\text{-}pitch}$ from the pitch direction mounted angle detecting unit 50 and the evaluation result from the mounted angle effect evaluating unit 51, and delivers to it to the reporting unit 5.

Next, the operation of the car navigation system of the embodiment 3 in accordance with the present invention with the foregoing configuration will be described centering on the body attitude measuring processing.

As described in the embodiment 1 or embodiment 2, when the yaw direction mounted angle detecting unit 46 or the pitch direction mounted angle detecting unit 50 detects the mounted angle of the casing in the body, the mounted angle effect evaluating unit 51 evaluates in the body pitch angle estimating unit 47 the difference in the body pitch angle due to the presence or absence of the correction of the mounted angle in the body and the effect of the heading angle error (during a right or left turn, circumferential turn traveling or slope traveling) exerted by the body pitch, and delivers the evaluation result to the reporting control unit 52.

Figure 9:
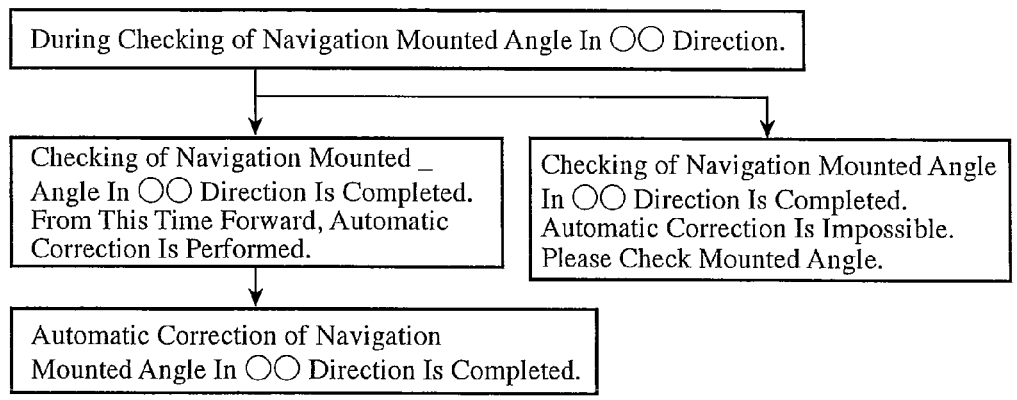
FIG. 9 is a diagram showing an example of displaying on a screen a telop about an automatic detection result and automatic correcting state of the mounted angle of the car navigation system in the body in the embodiment 3 in accordance with the present invention.
Figure 10:
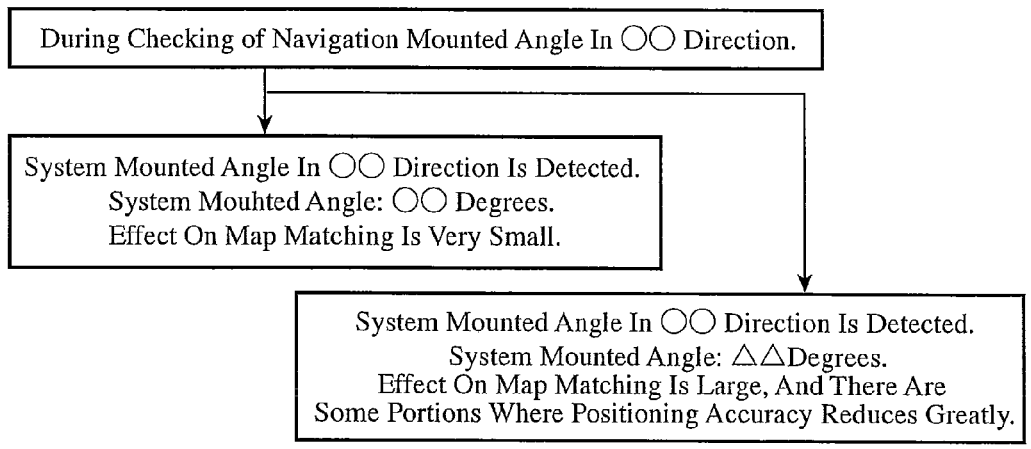
FIG. 10 is a diagram showing an example of displaying on a screen a telop about the automatic detection result and the effect of the mounted angle in the body on the positional accuracy in the embodiment 3 in accordance with the present invention.
Figure 11:
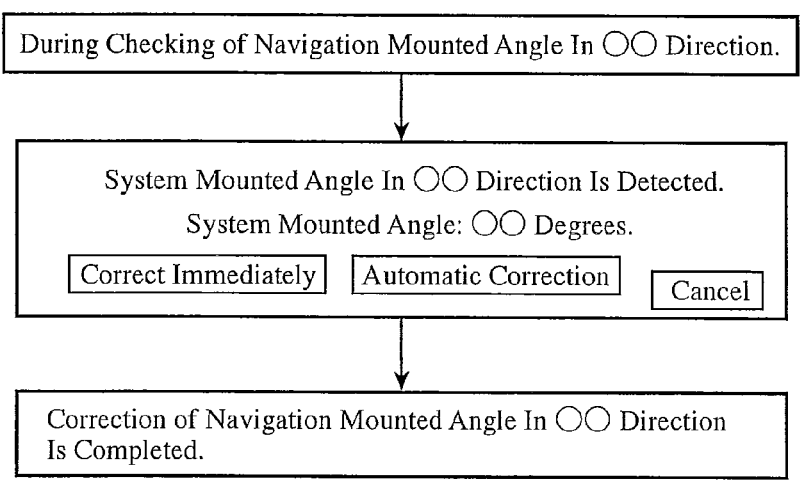
FIG. 11 is a diagram showing an example of displaying on a screen a telop about an automatic detection result and automatic correcting state of the mounted angle of the car navigation system in the body and an example of soft buttons for selecting a handling method of the mounted angle in the embodiment 3 in accordance with the present invention.

Receiving the evaluation result, the reporting control unit 52 requests the reporting unit 5 to display one of the telops shown from FIG. 9 to FIG. 11 from the start to the end of the detection of the mounted angle in the body in the yaw direction mounted angle detecting unit 46 or pitch direction mounted angle detecting unit 50, and the reporting unit 5 reports for prescribed duration.

FIG. 9 is a diagram showing an example of displaying on the monitor screen telops about the automatic detection result and automatic correcting state of the mounted angle of the car navigation system in the body. FIG. 10 is a diagram showing an example of displaying on the monitor screen telops about the automatic detection result of the mounted angle of the car navigation system in the body and the effect of the mounted angle on the positional accuracy. FIG. 11 is a diagram showing an example of displaying on the monitor screen the telops about the automatic detection result and automatic correcting state of the mounted angle of the car navigation system in the body together with soft buttons for selecting a handling method of the mounted angle.

If any one of the soft buttons is pressed on the screen shown in FIG. 11, the operation input unit 6 delivers the designated handling method to the signal processing unit 4. If the designated handling method is "Immediate Correction", the signal processing unit 4 calculates the body pitch angle using the detected mounted angle in the body just as it is. If the designated handling method is "Cancel", the signal processing unit 4 calculates the body pitch angle using the mounted angle in the body detected up to that time without using the mounted angle in the body detected just now. If the designated handling method is "Automatic Correction", the signal processing unit 4 calculates the body pitch angle using the detected mounted angle in the body at a prescribed ratio.

As described above, according to the car navigation system of the embodiment 3 in accordance with the present invention, since it reports, as to the mounted angle of the casing when it is fixed to the body, the result and effect the car navigation system automatically detects, it enables a user to recognize the presence or absence of a problem as to the setting of the car navigation system in the body, and to recognize the processing of the car navigation system. In addition, by altering the setting state of the car navigation system in the car body manually, an advantage of being able to improve the reduction in the position measuring accuracy resulting from the setting of the car navigation system in the body can be expected. More specifically, since the result of the automatic detection of mounted angle of the car navigation system in the body, or the effect the mounted angle of the car navigation system in the body has on the positional accuracy of the car navigation system is reported, the present embodiment 3 can eliminate the conventional problem of mismeasuring the body attitude such as the angular velocity and acceleration by using the sensor signal affected by the remaining axes when the car navigation system is set in the car body with an inclination.

In addition, since the present embodiment 3 determines the way of using the yaw direction mounted angle in the body and the pitch direction mounted angle in the body in accordance with the handling method the user designates by button operation or voice, the user can adjust the correcting speed and accuracy of the setting in the body according to the user's decision. Thus, the user can correct the mounted angle in the body quickly when he or she makes a decision that the detection accuracy thereof is high. In contrast, when the user makes a decision that the detection accuracy of the mounted angle in the body is low, he or she can carry out the correction slowly or cancel it. More specifically, since the present embodiment 3 is configured in such a manner as to notify the user of the result of automatically detecting the mounted angle of the car navigation system in the body, or the options of the handling method, and to correct the effect of the inclination of the sensor detection axis on the body attitude in accordance with the handling method the user designates in response to the notification, it can eliminate the conventional problem of mismeasuring the body attitude such as the angular velocity and acceleration using the sensor signal affected by the remaining axes when the car navigation system is set in the car body with an inclination, and the attitude angle of the body with respect to a horizontal plane is nonzero.

Incidentally, in the foregoing embodiment 3, although the reporting unit 5 is configured in such a manner as to utilize the monitor of the car navigation system to display the telop, it is also possible to use a speech synthesis device to produce speech. The configuration can also achieve the same advantage as the case of displaying the telop. In addition, although the operation input unit 6 is configured in such a manner as to use the touch panel on the monitor screen and to make input by using the soft buttons formed on the monitor screen, it is also possible to employ a speech recognition device to input by voice. The configuration can also achieve the same advantage as the case of inputting with the soft buttons.

In the foregoing embodiment 1-embodiment 3, although they are configured in such a manner as to measure the body attitude angle using a single angular velocity sensor and a single acceleration sensor, this is not essential. For example, providing the angular velocity sensor and acceleration sensor to the remaining axes having no such sensors in the foregoing embodiments enables the foregoing embodiments to acquire the measured value of the acceleration or angular velocity of the remaining axes instead of the estimated value, which enables measurement of the body attitude more accurately.

INDUSTRIAL APPLICABILITY

As described above, the car navigation system in accordance with the present invention becomes a car navigation system capable of measuring the position and heading angle of the vehicle at high accuracy by correcting the body attitude using the mounted angle of the casing in the body. Accordingly, it is suitable for applying to the car navigation system whose mounted angle is not limited.

What is claimed is:

1. A car navigation system comprising:
a casing;
an acceleration sensor for outputting a signal corresponding to acceleration having a sensor detection axis in a back and forth direction of the casing on a horizontal plane; and
a processing device programmed to execute a process comprising:
estimating, based on the casing being set in the body of a vehicle with a rotation in a yaw direction, a plurality of values of the output signal of the acceleration sensor at a respective plurality of prescribed angles in the yaw direction based on other sensor output signals,
subtracting an offset component of the signal from the signal output from the acceleration sensor,
comparing the resultant value of the subtraction with the plurality of estimated values corresponding to the respective plurality of prescribed angles,
selecting based on the comparisons which of the plurality of estimated values agrees most closely with the resultant value of the subtraction, and
determining, as a yaw direction mounted angle of the casing in the body, the prescribed angle that was selected from among the plurality of prescribed angles corresponding to the estimated values as agreeing most closely with the resultant value of the subtraction.

2. A car navigation system comprising:
a casing;
a distance sensor for outputting a pulse signal corresponding to a distance of vehicle movement by a vehicle;
an angular velocity sensor for outputting a signal corresponding to angular velocity having a sensor detection axis in a vertical direction of the casing;
an acceleration sensor for outputting a signal corresponding to acceleration having a sensor detection axis in a back and forth direction of the casing on a horizontal plane; and
a processing device programmed to execute a process comprising:
measuring a body direction of vehicle movement velocity and a body direction of vehicle movement acceleration from the pulse signal delivered from the distance sensor,
measuring angular velocity from the signal output from the angular velocity sensor,
estimating a body roll angle from the measured body direction of vehicle movement velocity and from the measured angular velocity,
estimating an acceleration sensor signal component obtained by combining an acceleration sensor signal component of the measured body direction of vehicle movement acceleration and an acceleration sensor signal component of the estimated body roll angle,
subtracting the estimated acceleration sensor signal component from the signal output from the acceleration sensor to obtain a temporary offset value, and
determining based on a temporary offset value which continues to stay within a prescribed range more than a prescribed distance or prescribed angle, a pitch direction mounted angle of the casing in the body of the vehicle from a difference between an offset reference value and the temporary offset value.

3. The car navigation system according to claim 1, further comprising:
a distance sensor for outputting a pulse signal corresponding to a distance of vehicle movement by a vehicle; and
an angular velocity sensor for outputting a signal corresponding to angular velocity having a sensor detection axis in a vertical direction of a casing,
wherein the process executed by the processing device further comprises
measuring body direction of vehicle movement velocity and body direction of vehicle movement acceleration from the pulse signal delivered from the distance sensor,
measuring angular velocity from the signal output from the angular velocity sensor, estimating a body roll angle from the measured body direction of vehicle movement velocity and from the measured angular velocity, combining, on a basis of the determined yaw direction mounted angle in the body, an acceleration sensor signal component of the measured body direction of vehicle movement acceleration and an acceleration sensor signal component of the estimated body roll angle, estimating a body pitch angle from a signal remaining after subtracting a signal component obtained by the combining from the signal output from the acceleration sensor, and converting, using the estimated body pitch angle and the estimated body roll angle, the angular velocity having the sensor detection axis in the vertical direction of the casing, and body direction of vehicle movement acceleration, velocity and distance into angular velocity about a vertical axis, and acceleration, velocity and distance in the direction of vehicle movement on a horizontal plane.

4. The car navigation system according to claim 2, wherein the process executed by the processing device further comprises:

combining the acceleration sensor signal component of the measured body direction of vehicle movement acceleration and the acceleration sensor signal component of the estimated body roll angle for calculating a body pitch angle from a signal remaining after subtracting a signal component obtained by the combining from the signal output from the acceleration sensor, and for correcting the calculated body pitch angle using the determined pitch direction mounted angle in the body, and converting, using the calculated body pitch angle and the estimated body roll angle, the angular velocity having the sensor detection axis in the vertical direction of the casing, and body direction of vehicle movement acceleration, velocity and distance into angular velocity about a vertical axis, and acceleration, velocity and distance in the direction of vehicle movement on a horizontal plane.

5. The car navigation system according to claim 3, wherein the process executed by the processing device further comprises:

calculating a body rolling acceleration signal component of the acceleration sensor using the estimated body roll angle and the measured angular velocity, wherein the body pitch angle is calculated by further using the calculated body rolling acceleration signal component.

6. The car navigation system according to claim 1, further comprising:

a distance sensor for outputting a pulse signal corresponding to a distance of vehicle movement by a vehicle;

an angular velocity sensor for outputting a signal corresponding to angular velocity having a sensor detection axis in a vertical direction of a casing; and an output device, wherein the process executed by the processing device further comprises:

estimating an acceleration sensor signal component obtained by combining an acceleration sensor signal component of the measured body direction of vehicle movement acceleration and an acceleration sensor signal component of the estimated body roll angle estimated by the body roll angle estimating unit;

measuring body direction of vehicle movement velocity and body direction of vehicle movement acceleration from the pulse signal delivered from the distance sensor;

measuring angular velocity from the signal output from the angular velocity sensor;

estimating a body roll angle from the measured body direction of vehicle movement velocity and from the measured angular velocity;

determining, when a temporary offset value continues to stay within a prescribed range more than a prescribed distance or prescribed angle, a pitch direction mounted angle of the casing in the body from a difference between an offset reference value and the temporary offset value, wherein the temporary offset value is obtained by subtracting from the signal output from the acceleration sensor the estimated acceleration sensor signal component;

evaluating an effect on position measuring accuracy of the determined yaw direction mounted angle in the body and the determined pitch direction mounted angle in the body; and reporting via the output device at least one of the yaw direction mounted angle in the body and the pitch direction mounted angle in the body, and a result of the evaluating.

7. The car navigation system according to claim 6, wherein the process executed by the processing device further comprises:

obtaining a body pitch angle by performing at least one of:
(a) estimating a body pitch angle by:
 (a-1) combining, on a basis of the determined yaw direction mounted angle in the body, an acceleration sensor signal component of the measured body direction of vehicle movement acceleration and an acceleration sensor signal component of the estimated body roll angle; and
 (a-2) estimating a body pitch angle from a signal remaining after subtracting a signal component obtained by the combining of (a-1) from the signal output from the acceleration sensor, and
(b) calculating a body pitch angle by:
 (b-1) combining the acceleration sensor signal component of the measured body direction of vehicle movement acceleration and the acceleration sensor signal component of the estimated body roll angle estimated by the body roll angle estimating unit;
 (b-2) calculating a body pitch angle from a signal remaining after subtracting a signal component obtained by the combining of (b-1) from the signal output from the acceleration sensor; and
 (b-3) correcting the calculated body pitch angle using the determined pitch direction mounted angle in the body; and converting, using the obtained body pitch angle and the estimated body roll angle, the angular velocity having the sensor detection axis in a vertical direction of the casing, and body direction of vehicle movement acceleration, velocity and distance into angular velocity about the vertical axis, and acceleration, velocity and distance in the direction of vehicle movement on a horizontal plane.

8. The car navigation system according to claim 7, further comprising:

an operation input unit for inputting a response to the reporting via the output device, wherein the converting is carried out according to the input from the operation input unit.

9. The car navigation system according to claim 3, wherein the process executed by the processing device further comprises:

correcting, when a value remaining after subtracting a value of the estimated body pitch angle from the signal output from the acceleration sensor continues to stay in a prescribed range more than a prescribed distance or prescribed angle, an offset of the acceleration sensor using the value of the estimated body pitch signal.

* * * * *